(12) United States Patent
Weber

(10) Patent No.: US 7,771,176 B2
(45) Date of Patent: Aug. 10, 2010

(54) MICROPUMP AND METHOD FOR THE PRODUCTION THEREOF

(75) Inventor: Lutz Weber, Zweibrücken (DE)

(73) Assignee: thinXXS GmbH, Zweibrucken (DE)

( * ) Notice: Subject to any disclaimer, the term of this patent is extended or adjusted under 35 U.S.C. 154(b) by 563 days.

(21) Appl. No.: 10/527,207

(22) PCT Filed: Sep. 4, 2003

(86) PCT No.: PCT/EP03/09799

§ 371 (c)(1), (2), (4) Date: Nov. 7, 2005

(87) PCT Pub. No.: WO2004/031580

PCT Pub. Date: Apr. 15, 2004

(65) Prior Publication Data

US 2006/0140782 A1 Jun. 29, 2006

(30) Foreign Application Priority Data

Sep. 11, 2002 (DE) .............................. 102 42 110

(51) Int. Cl.
*F04B 17/03* (2006.01)
*F04B 53/10* (2006.01)
*F16K 15/14* (2006.01)

(52) U.S. Cl. .................... 417/410.2; 417/566; 417/571; 137/859

(58) Field of Classification Search .............. 417/413.2, 417/571, 559, 566, 410.1, 410.3; 137/859
See application file for complete search history.

(56) References Cited

U.S. PATENT DOCUMENTS

| 3,881,519 | A | * | 5/1975 | Zahid ............................ 138/30 |
| 4,514,742 | A | * | 4/1985 | Suga et al. ..................... 347/85 |
| 4,966,185 | A | * | 10/1990 | Schram ........................ 137/223 |
| 5,025,829 | A | | 6/1991 | Edwards et al. |
| 5,718,567 | A | * | 2/1998 | Rapp et al. ................... 417/395 |
| 6,116,866 | A | * | 9/2000 | Tomita et al. ............. 417/413.2 |
| 6,240,962 | B1 | * | 6/2001 | Tai et al. ...................... 137/859 |
| 6,334,761 | B1 | | 1/2002 | Tai et al. |
| 6,357,468 | B1 | * | 3/2002 | Roussel ....................... 137/223 |

FOREIGN PATENT DOCUMENTS

| EP | 0 324 519 | 7/1989 |
| EP | 0 424 087 | 4/1991 |
| EP | 0 934 757 | 8/1999 |

* cited by examiner

*Primary Examiner*—Charles G Freay
(74) *Attorney, Agent, or Firm*—Lucas & Mercanti, LLP; Klaus P. Stoffel

(57) ABSTRACT

The invention relates to a micropump comprising a pump membrane (5) which can be moved by modifying the volume of a pump chamber which is adjacent to the pump membrane (5) and a base part (1), also comprising two valves which are arranged in recesses (10,11) in the base part and react to the pressure in the pump chamber in order to alternately open and close an inlet channel (8) and an outlet channel (9) for a medium to be pumped. According to the invention, the valves are formed by functioning valve modules (40,41) without any common components. The pre-manufactured valve modules, base modules comprising the base part and hose connections (2,3) and actuator modules comprising the actuator and the membrane are combined in order to produce said micropumps.

21 Claims, 4 Drawing Sheets

(a)

(b)

(c)

(d)

(e)

MICROPUMP AND METHOD FOR THE PRODUCTION THEREOF

BACKGROUND OF THE INVENTION

1. Field of the Invention

The invention relates to a micropump comprising a pump membrane which can be moved by modifying the volume of the pump chamber which is adjacent to the pump membrane and a base part, also comprising two valves which area arranged in recesses in the base part and react to the pressure in the pump chamber in order to alternately open and close an inlet channel and an outlet channel for a medium to be pumped.

The invention further relates to a method for producing such a micropump.

2. Description of the Related Art

The lateral measurements of such micropumps which are fully or predominantly made of plastics are preferably between 5 and 30 mm for a height of 0.5 to 5 mm. The pump rates for fluids range between $10^{-5}$ and 0.2 l/min. The main fields of application include chemical and biochemical analytics, microreaction technology, the conveyance of gases, the conveyance and dosage of pharmaceutical agents, specimen fluids, adhesives, fuels or lubricants.

Plastic micropumps have the advantage over pumps made of silicon or metals that apart from the utilization of inexpensive base materials, efficient production methods such as injection molding can be deployed. Depending on the requirements for example in connection with optical transparency, stability, hydrophilicity, hydrophobicity or chemical resistance, different plastics may be deployed using the same construction, such as for example polycarbonate, polypropylene, polyethylene, cyclo-olefin-copolymer, polyetheretherketone, polyphenylensulfide or fluorine plastics.

DE 44 02 119 describes a micropump made of plastic comprising a membrane arranged between two shell halves which serves as a pump membrane as well as for forming movable valve bodies, and which is open-worked at valve seats.

A micropump of the afore-mentioned type is known from DE 197 20 482. By forming a pump chamber, a pump membrane is mounted on the top side of a two-part base part having recesses for valves in its interior, which can be deformed by means of a piezo actuator. A valve membrane arranged between both parts of the base part has a gap on both valve seats and thus comprises a component common to both valves.

By using relatively large valve membranes which are involved in forming both valves, the production of such micropumps is very costly. It is particularly problematic to arrange the gaps in the membrane on the valve seats with the accuracy necessary for the functioning of the valves. On the one hand, the distortion and shrinkage effects typical for plastic materials lead to big position fluctuations of the gaps on the membrane. On the other hand, misplacements of the gaps on the valve seats can occur rather easily during the assembly of the thin and cumbersome membrane film. The production yield under the conditions of serial production is thus very low.

SUMMARY OF THE INVENTION

The present invention has the object to create a new micropump of the afore-mentioned type which can be manufactured at lower costs compared to such known micropumps.

The micropump meeting this object according to the invention is characterized in that the valves are made without common components by means of stand-alone functioning valve modules featuring a valve seat and valve body.

The assembly of stand-alone functioning value modules does not require an outlay comparable with the assembly of the valve membrane in the micro membrane pumps according to the state of the art, whose exact arrangement in the pump housing determines the operability of the valves.

Both valve modules, i.e., the inlet valve module and the outlet valve module, can be advantageously identical in construction, wherein the valve seat always points in the direction of the conveyance flow. This measure which raises the share of parts with identical construction also contributes to a reduction in production costs of the micropump.

In the preferred embodiment of the invention the recesses are designed as hollows which are open toward the pump chamber, into which the valve modules can be inserted precisely and with little effort during the final assembly of the pump.

It is practical if the height of the valve module matches the depth of the hollow. This largely prevents the formation of dead volume.

In the preferred embodiment of the invention the valve module comprises two parts with one, preferably rotationally symmetrical seat component, and a valve body arranged in a cavity in the seat component, preferably a spring component, for closing and opening a valve opening in the seat component. The opening is preferably arranged coaxially relative to the rotational axis of symmetry for the rotationally symmetrical design of the seat component.

The spring component can by connected with the seat component in one outer ring area which is centered by the seat component, and may exhibit a lip element extending from the outer ring area inwards for closing or opening the valve opening. Differently designed spring components can be combined with the same seat component depending on the performance requirements of the micropump. Pumps with different properties differ only in regards to the spring components.

In a further advantageous embodiment of the invention, the micropump is further made of a prefabricated base module comprising a base part and hose connections, and a prefabricated actuator module which contains the membrane and if applicable, a piezo disk connected with the membrane.

Such a modular design further contributes to the reduction of production costs. Separate product development, production and quality assurance for components of the pump increase the production confidence as well as the flexibility and retooling work during the serial production of various pump variations. The stand-alone functioning modules make large positioning tolerances possible and facilitate assembly.

It is practical to design the base module, apart from the recesses in the base part, and the actuator module rotationally symmetrical, wherein the pump membrane is connected with the base part, if necessary, via a support ring which rests on a ring seat, particularly a ring shoulder, on the base part. The rotationally symmetrical parts or the tools required for their production can be produced at relatively little cost. The actuator module can be centered with little effort on the base module without position control by means of the support ring resting on the ring seat.

The base part is preferably a disk part, wherein the channels for the inlet and outlet of the pumped medium conveniently extend perpendicularly to the disk plane, via the shortest path through the base part. This is advantageous in order to minimize the flow resistance within the micropump.

The base module can be made in one piece with the hose connections, for example, as an injection mold.

At least the pump parts which come into contact with the medium are made of plastic which is resistant against the pumped medium and, if necessary, protects parts which are not of plastic from aggressive mediums. For example, the membrane can be made of several layers in order to attain the desired deforming properties, wherein for example, a layer shielded by a plastic layer can be made of a metal.

BRIEF DESCRIPTION OF THE DRAWING

The invention shall now be illustrated in more detail based on the embodiments and the attached drawings corresponding thereto as follows.

DETAILED DESCRIPTION OF THE INVENTION

Figure 1:
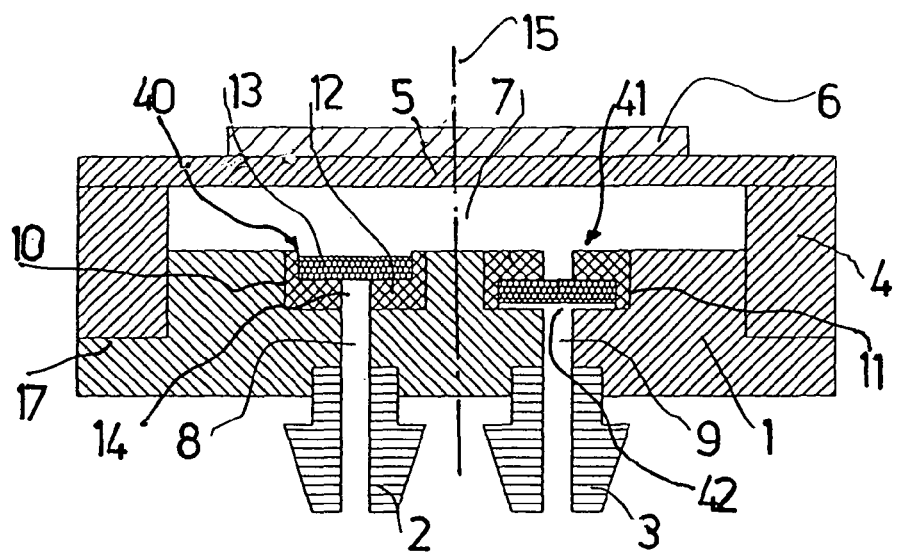
FIG. 1 is a sectional view of a micropump according to the invention.

In FIG. 1 the reference numeral 1 designates a disk-shaped base part with a ring shoulder 17 at the circumference. The inlet connection 2 and the outlet connection 3 are attached to the base part 1. A membrane 5 connected with the ring support 4 at its outer edge by means of gluing or welding rests on the base part 1 over a ring support 4, the membrane itself being glued to a piezo disk 6. The ring support 4 could also be connected in one piece with the membrane 5.

A pump chamber 7 is formed between the membrane 5 and the base part 1 which is connected with the membrane by means of gluing or welding.

An inlet channel 8 is attached to the inlet connection 2 and an outlet channel 9 is attached to an outlet connection 3, wherein both channels each flow into a round cylindrical recess 10 or 11 in the base part 1. The channels 8 and 9 are arranged concentrically relative to the respective recess 10 and 11. Identically built valve modules 40 and 41 with a seat component 12 and a spring component 13 are seated in the recesses 10 and 11 which are formed as hollows open toward the pump chamber 7, wherein the spring component faces the inlet valve module 40 in the recess 10 of the pump chamber 7, and the spring component faces away from the outlet valve module 41 in recess 11 of the pump chamber 7. The seat component 12 has an opening 14 facing toward the inlet channel 8.

Figure 2:
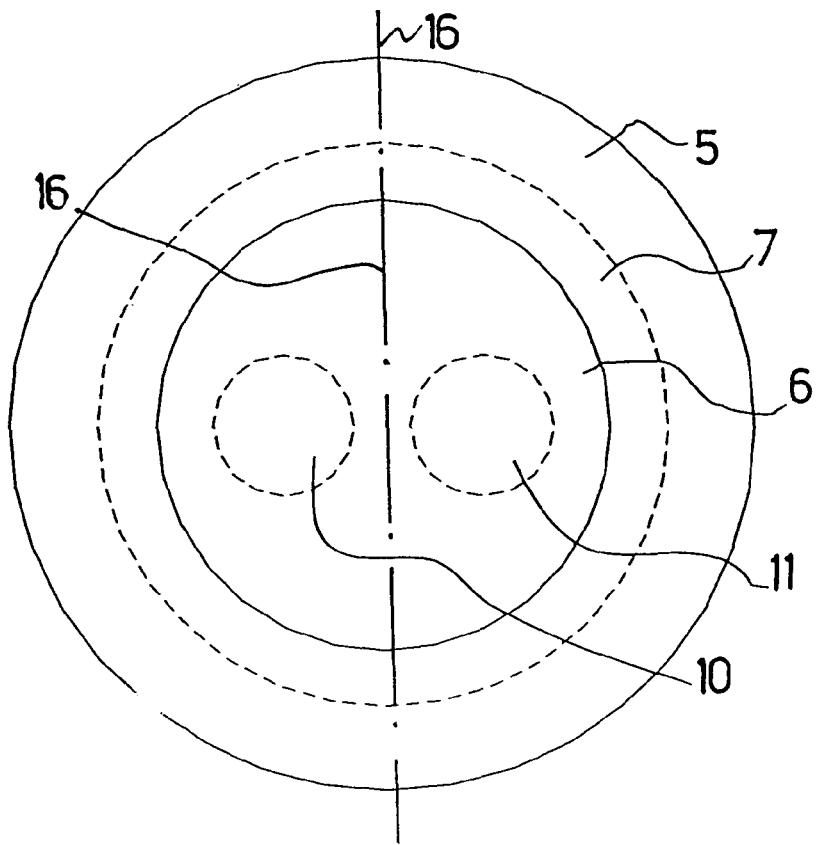
FIG. 2 is a top view of the micropump of FIG. 1.

Aside from the connections, channels and valve modules, the micropump shown in FIGS. 1 and 2 is designed rotationally symmetrical to an axis 15. As can be seen in FIG. 2, the connections, channels and valve modules are arranged symmetrically relative to a plane 16 which contains the rotational symmetry axis 15 and which cuts the pump in two halves.

During the production of the micro membrane pump as shown in FIGS. 1 and 2, three different modules are prefabricated independently of each other prior to their final assembly, namely the actuator modules comprising the piezo disk 6, the membrane 5 and the support ring 4, the base modules comprising the one-piece base part 1 and the connections 2 and 3, and the valve modules comprising the seat component 12 and the spring component 13.

The individual parts of the mentioned modules, as well as the modules themselves, are preferably welded together, wherein glued connections are just as suitable as welded connections.

In the respective embodiment, all parts of the pump with the exception of the ceramic piezo disk are made of plastic.

The pump made up of the modules can be easily manufactured. Since the valve modules are prefabricated as stand-alone functioning parts, the functioning of the valves does not depend on the accuracy of their arrangement.

The piezo disk 6 moves the membrane 5 for letting in the fluid to be pumped, thereby increasing the volume of the pump chamber 7.

At the beginning of the inlet phase the membrane is dented as shown in the respective illustration of the embodiment. The created negative pressure lifts the spring component 13 of the inlet valve module 40 off its opening 14. The medium to be pumped flows via the inlet channel 8 through the released opening 14 and cutouts in the spring component (FIG. 5) into the pump chamber 7. At the end of the inlet phase according to this embodiment, the membrane 5 has its flat form as shown in FIG. 1. The spring component 13 of the inlet valve module 40 closes during the renewed denting of the membrane 5 by means of the piezo disk 6 and the creation of a positive pressure in the pump chamber 7. Meanwhile, the spring component 13 of the outlet valve module 41 lifts off its opening 14. In the lifted position the spring component 13 of the outlet valve module 41 remains retracted relative to the floor of the recess 11. A medium to be pumped can now drain off through the opening 14 of the outlet valve module 41, a clearance 42 formed between the spring component 13 and the floor of the recess 11, and the outlet channel 9. The actuator moves periodically with frequencies typically between $10^0$ and a few $10^2$ Hz.

In the following figures identical parts or parts with identical functions are designated with the same reference number as in previous figures, wherein a letter a, b, etc. is consecutively added to the respective reference numbers from figure to figure.

Figure 3:
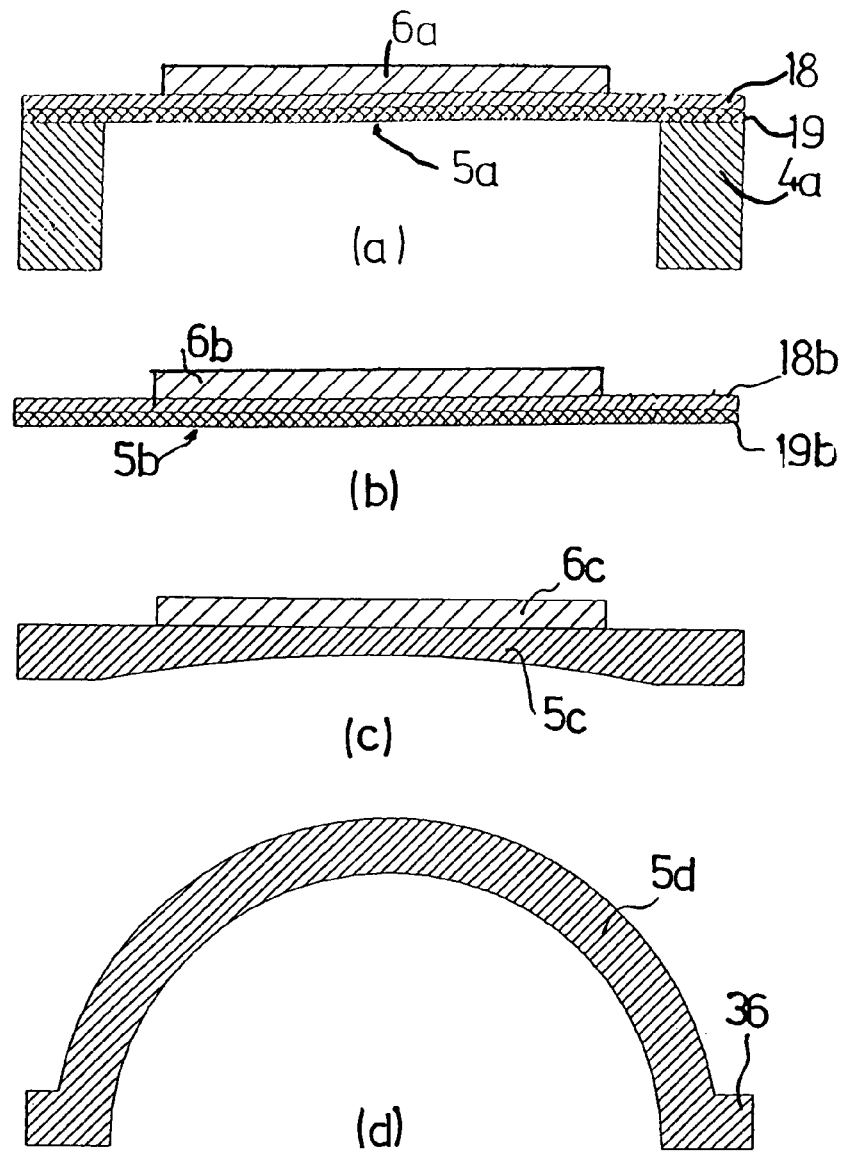
FIG. 3 shows additional embodiments for actuator modules which can be used in a micropump according to the invention.

FIG. 3a shows an actuator module with a support ring 4a, a membrane 5a and a piezo disk 6a, wherein the membrane 5a comprises two layers 18 and 19. The layer 18 is made of a metal, for example, steel or brass. The layer 19 adjacent the pump chamber and therefore adjacent the medium is made of a plastic. The desired deforming performance of the membrane is attained by means of the metal layer. The plastic layer protects the metal layer from aggressive transport material and is resistant against the medium to be pumped. Semi-cristalline plastics, such as polypropelene, amorphous plastics, such as polycarbonate, or high-performance plastics, such as polyphenylene sulphide, polyetheretherketone or plastic containing fluorine may be deployed for this purpose.

An actuator module shown in FIG. 3a exhibits a membrane 5b comprising two such layers 18b and 19b and a piezo disk 6b. The module is attached without a support ring directly onto a base part, which differs from the base part of FIG. 1 in that no ring shoulder 17 is provided. Rather, a rim heightening could form a centering seat. Consequently, a self-priming pump suited for pumping small volume flows results with a pump chamber volume that fluctuates between 0 and a maximum value, wherein the membrane 5*b* is only deformed by means of the piezo disk 6*b*.

An additional actuator module for such a pump is shown in FIG. 3*c* whose pump chamber volume fluctuates between 0 and a maximum value. A membrane 5*c* connected with a piezo disk 6*c* exhibits on its side facing the pump chamber a recess corresponding to the maximum pump chamber volume, which disappears during the denting of membrane 5*c* by means of the piezo disk 6*c*.

FIG. 3*d* shows an actuator module with a cap-like shaped membrane 5*d* made of plastic, which is connectable via a flange 36 with the base module. The resetable membrane 5*d* may be dented for example directly by hand with the thumb or by means of an appropriate tappet of an actuator which is temporarily or permanently connected with the pump. Compared to an actuator module with a piezo disk, longer membrane lifts and correspondingly bigger changes in the pump chamber volume can be achieved. A micropump with such a membrane could be deployed for example in the context of environment protection for taking samples.

Figure 4:
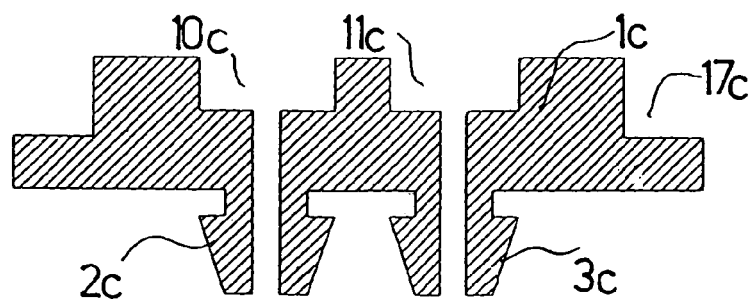
FIG. 4 is a further illustration of an embodiment for a base module to be used in a micro membrane pump according to the invention.

FIG. 4 shows an alternative embodiment of a base module with a base part 1*c*, which is formed in one piece with an inlet connection 2*c* and an outlet connection 3*c*.

Figure 5:
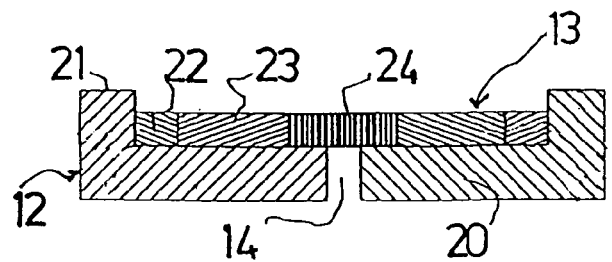
FIG. 5 is sectional, side view of a valve module used in the micro membrane pump of FIGS. 1 and 2, FIGS. 6 and 7 are additional illustrations of embodiments for valve modules which can be used in a micro membrane pump according to the invention.
Figure 6:
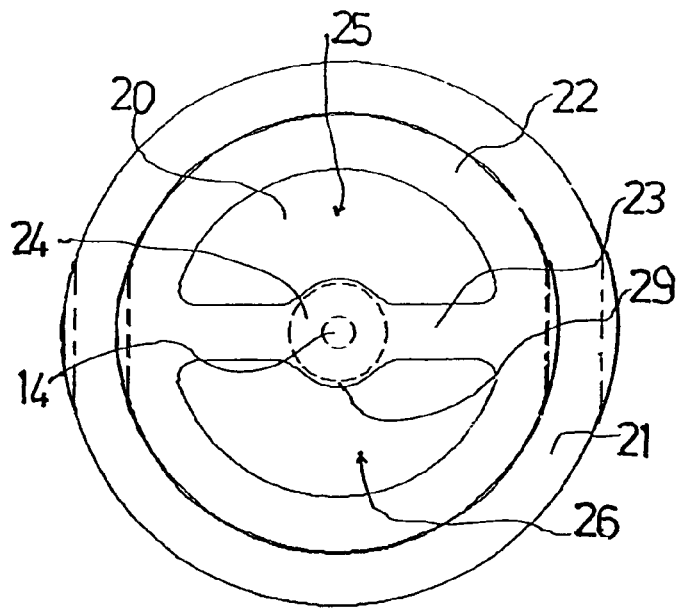

FIGS. 5 and 6 show in more detail the design of the valve modules 40 and 41 used in the micro membrane pump of FIGS. 1 and 2.

The seat component 12 of the valve module exhibits a floor plate 20 and a ring-shaped rim heightening 21 by means which a vessel-like cavity is created for the spring component 13. The height of the rim heightening is equal to the depth of the recesses 10 and 11. The top side of the spring component is positioned backwards against the rim heightening 21. The spring component 13 is glued or welded via a ring-shaped rim area 22 to the seat component 12. As can be seen in FIG. 6, the spring component 13 exhibits a lip element 23 which spans the ring-shaped rim area diametrically with an expansion 24 in the area of a valve seat 29. The spring component 13 can be made out of a plastic film, wherein the film thickness can be between 0.01 and 0.3 mm.

Under the influence of pressure in the pump chamber 7 the lip element 23 lifts, particularly its expansion 24, while releasing the opening 14 off the seat area or lies against the seat area while closing the opening. When the valve is open, the medium which is discharged from the opening 14 can flow through the openings formed by the cutouts 25 and 26 in the spring component 13 and reaches the pump chamber 7 or the outlet channel 9.

Figure 7:
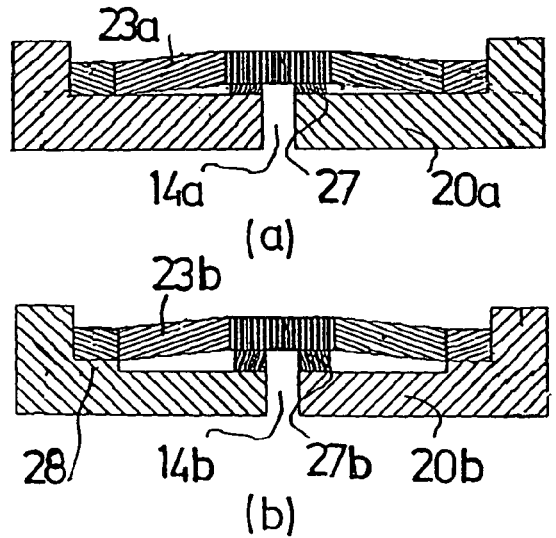

In the embodiment for a valve module according to FIG. 7*a*, a ring heightening 27 extending from a floor plate 20*a* is formed in the area of the valve seat, which provides for a suitable prestressing of the elastic lip element 23*a* and thus enables a secure closing of the valve.

In the embodiment of FIG. 7*b* an elevated rim seat 28 is formed next to a rim heightening 27*b* on the valve seat, which lifts a lip element 23*b* over its entire length from a floor plate 20*b*. This embodiment has the advantage that the particles transported along with the conveyed material cannot settle between the bottom side of the lip element and the floor plate.

In the following further embodiments for circular spring components are described which can be optionally installed in the seat component 12.

In the embodiment shown in FIG. 8*a* a lip element 23*c* with an expansion 24*c* in the seat area is connected only at one end with the remaining spring component, and a slot cutout 30 is formed. By means of such a design, low spring constants of the lip element can be attained.

In the embodiment shown in FIG. 8*b* a lip element 23*d* with an expansion 24*d* in the area of the valve seat is formed through slot cutouts 31 and 32, which is connected at both ends with the remaining spring component. The spring constant of this lip element which connected with both sides to the remaining spring component can be higher than that of the preceding embodiment. The expansion 24*d* is less inclined to tilting and thus rests more evenly on the valve seat than in the previous embodiment.

An even higher spring constant and resting evenness is achieved by the embodiment of FIG. 8*c*, wherein a three-armed lip element 23*e* with an expansion 24*e* is formed through three slot cutouts 33, 34 and 35. The junctures of the lip element with the remaining film are evenly dispersed across the circumference of ring area which is provided for the connection with the seat component.

In the embodiment of FIG. 8*d* two slot cutouts 31*f* and 32*f* which are nested in one another are provided through which an almost ring-shaped lip element with an inwardly protruding expansion 24*f* is formed. In this embodiment, a comparatively low spring constant of the lip element 23*f* can be combined with an even arrangement of the expansion 24*f* in the valve seat area.

FIG. 8*e* shows a spring component with a straight lip element 23*g* formed through two slot cutouts 31*g* and 32*g*, having an expansion 24*g* which protrudes laterally toward the middle of the spring component.

Figure 8:
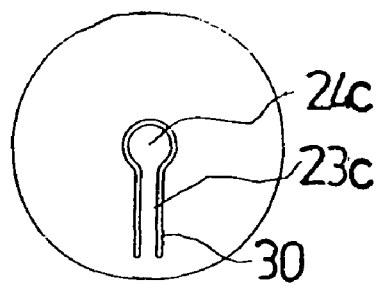
FIG. 8 shows further illustrations of embodiments for valve spring components which can be used in a micro membrane pump according to the present invention.
Figure 8:
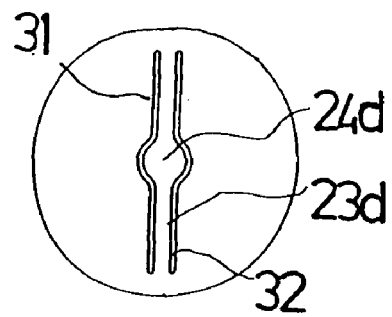
Figure 8:
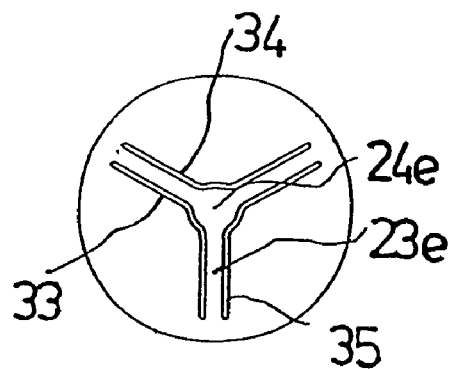
Figure 8:
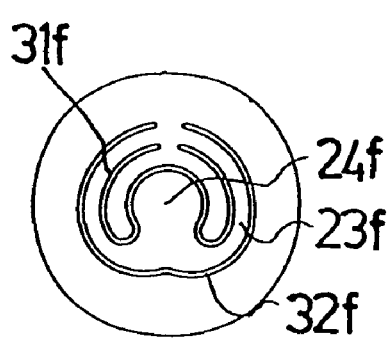
Figure 8:
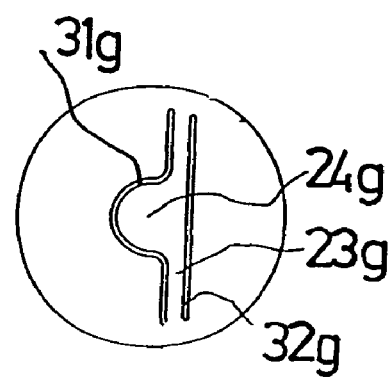

All of the spring components shown in FIG. 8 feature narrow openings which follow the contours of the lip element and which advantageously do not form a large dead volume. Depending on the design, the spring constants of the lip element are between 0.8 mN and 0.0005 mN per micrometer deflection.

The invention claimed is:

1. A micropump with a pump membrane which can be moved to modify the volume of a pump chamber which is adjacent to the pump membrane and a base part, also comprising two valves which are arranged in recesses in the base part and react to the pressure in the pump chamber in order to alternately open and close an inlet channel and an outlet channel for a medium to be pumped, wherein the valves are formed without any common components by standalone functioning valve modules comprising a valve seat and a valve body, wherein the valve modules (40, 41) consist of only a seat component (12) forming the valve seat and a spring component (13) forming the valve body, and wherein the seat component has a recess formed by a rim heightening (21) of a floor plate (20), wherein the rim heightening (21) projects from the floor plate (20) in the through-flow direction of the valve, wherein the rim heightening (21) is integrally connected with the floor plate (20), and wherein the spring component (13) placed in the recess and located adjacent the rim heightening (21) is centered by the rim heightening (21), wherein the spring component (13) is connected with an annular rim portion to the floor plate (20), and wherein a side of the spring component (13) facing away from the floor plate (20) is entirely free.

2. The micropump according to claim 1, wherein both valve modules are identically constructed.

3. The micropump according to claim 1, wherein hollows which are open toward the pump chamber are formed as recesses.

4. The micropump according to claim 3, wherein the height of the valve module is equal to the depth of the hollow receiving the module.

5. The micropump according to claim 1, wherein the valve module is comprised of two parts with a rotationally symmetrical seat component, and a valve body for closing and opening of a central opening in the seat component.

6. The micropump according to claim 5, wherein the spring component exhibits a film in which a lip element is formed through at least one cutout and attached at one end or at several ends with the remaining film.

7. The micropump according to claim 6, wherein the cutout is a slot cutout following the contour of the lip element.

8. The micropump according to claim 6, wherein the spring component is connected with the seat component in an outer ring area which is centered by the seat component, from which the lip element extends inwards.

9. The micropump according to claim 5, wherein the seat component exhibits a ring heightening in the area of the valve seat which extends from a floor plate and which prestresses the lip element in the resting state.

10. The micropump according to claim 9, wherein the seat component has an elevated rim seat by means which the lip element is lifted across its entire length from the floor plate.

11. The micropump according to claim 8, wherein the lip element is connected with the ring area at two diametrical places or connected with the ring area at three places which are evenly distributed across the ring area.

12. The micropump according to claim 1, wherein it is composed of a base module which receives the valve modules and comprises a base part and hose connections, and of a actuator module which includes the membrane and a piezo disk connected to the membrane.

13. The micropump according to claim 12, wherein the base module, with exception of the recesses, and/or the actuator module is rotationally symmetrical.

14. The micropump according to claim 1, wherein the base part is disk-shaped and the base part has a disk plane and that the inlet and outlet channel extend perpendicularly relative to the disk plane.

15. The micropump according to claim 13, wherein a seat for the actuator module is formed on the base part, and the pump membrane rests over a support ring on a ring shoulder located on the base part.

16. The micropump according to claim 13, wherein the base module is formed in one piece with the hose connections.

17. The micropump according to claim 1, wherein at least the part of the pump which comes into contact with the medium is made of a plastic.

18. The micropump according to claim 1, wherein the membrane is made of one piece or exhibits several layers of different material.

19. The micropump according to claim 1, wherein the membrane exhibits a recess facing the pump chamber, which preferably corresponds to the maximum pump chamber volume.

20. The micropump according to claim 1, wherein the membrane is cap-like and can be moved manually or with the help of an actuation which is temporarily or permanently attached to the membrane.

21. A method for the serial production of micropumps according to claim 1, wherein the valve modules, base modules, which include the base part and connections, as well as the actuator modules which include the membrane, are prefabricated independently of one another and wherein the micropump is made up of these modules.

* * * * *